US007499404B2

United States Patent
Ravindran et al.

(10) Patent No.: US 7,499,404 B2
(45) Date of Patent: Mar. 3, 2009

(54) DISTRIBUTED QUALITY OF SERVICE ROUTING

(75) Inventors: Ravi S. Ravindran, Ottawa (CA); Guo-Qiang Wang, Nepean (CA); Krishnaiyan Thulasiraman, Norman, OK (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1155 days.

(21) Appl. No.: 10/232,063

(22) Filed: Aug. 30, 2002

(65) Prior Publication Data

US 2004/0042404 A1 Mar. 4, 2004

(51) Int. Cl.
G08C 15/00 (2006.01)
H04J 3/14 (2006.01)
H04L 12/28 (2006.01)
(52) U.S. Cl. .................... 370/238; 370/230; 370/255
(58) Field of Classification Search .................. None
See application file for complete search history.

(56) References Cited

U.S. PATENT DOCUMENTS

| 5,649,108 | A | * | 7/1997 | Spiegel et al. ............. 709/241 |
| 5,655,134 | A | * | 8/1997 | Yamazaki .................. 712/1 |
| 6,028,857 | A | * | 2/2000 | Poor ......................... 370/351 |
| 6,192,221 | B1 | * | 2/2001 | Hasegawa ................. 455/575.3 |
| 6,347,078 | B1 | * | 2/2002 | Narvaez-Guarnieri et al. .... 370/230 |
| 6,363,319 | B1 | * | 3/2002 | Hsu ........................... 701/202 |
| 6,587,438 | B1 | * | 7/2003 | Brendel ....................... 370/238 |
| 6,631,134 | B1 | * | 10/2003 | Zadikian et al. .......... 370/395.21 |
| 6,956,821 | B2 | * | 10/2005 | Szviatovszki et al. ....... 370/237 |
| 7,035,226 | B2 | * | 4/2006 | Enoki et al. ................ 370/254 |
| 7,106,698 | B1 | * | 9/2006 | Basso et al. ................ 370/232 |
| 2002/0085495 | A1 | * | 7/2002 | Jeffries et al. ............. 370/235 |
| 2002/0145376 | A1 | * | 10/2002 | Kakesu et al. .............. 313/440 |
| 2003/0056006 | A1 | * | 3/2003 | Katsube et al. ............. 709/238 |
| 2003/0118024 | A1 | * | 6/2003 | Lee et al. ................... 370/395.1 |
| 2003/0118026 | A1 | * | 6/2003 | Kuhl et al. ................. 370/395.21 |

(Continued)

OTHER PUBLICATIONS

Bagrodia, et al. (1998). "Parsec: A parallel Simulation Environment for Complex Systems" *IEEE Computer* 31 (10):77-85.

(Continued)

*Primary Examiner*—Chi H. Pham
*Assistant Examiner*—Warner Wong

(57) ABSTRACT

The present invention relates to distributed systems and methods for finding a path from a source node to a destination node where the path chosen satisfies a path constraint for a first additive path parameter and concurrently optimizes a second additive path parameter. One embodiment of the invention provides a routing method. The method includes receiving at a current node a construct path message from a neighboring previous node. The construct path message includes first and second values for first and second additive parameters. The method includes checking whether the first value satisfies an optimality condition and whether the second value indicates a feasible path given a path constraint. If the first value satisfies an optimality condition and the second value indicates a feasible path given a path constraint, then the method (i) sends out a construct path message to a next neighboring node, (ii) increments a number-of-acknowledgement-messages variable by the number of construct path messages sent, and (iii) adds an entry to a predecessor array stored at the current node. The entry includes an identifier for the predecessor neighboring node, the first path value, and the second path value. If not, the method sends an acknowledgement message to the neighboring previous node.

21 Claims, 9 Drawing Sheets

U.S. PATENT DOCUMENTS

2003/0137971 A1* 7/2003 Gibson et al. .............. 370/351
2004/0042404 A1* 3/2004 Ravindran et al. .......... 370/238
2004/0071089 A1* 4/2004 Bauer et al. ................. 370/238
2004/0202159 A1* 10/2004 Matsubara et al. ......... 370/389

OTHER PUBLICATIONS

Chandy and Misra. (1982). "Distributed Computation on Graphs: Shortest Path Algorithms" *Communications of ACM* 25(11):833-837.

Ravindran, et al. (2002) "Quality of Service Routing: Heuristics and Approximation Schemes with a Comparative Evaluation" *Circuits and Systems, ISCAS, IEEE International Symposium on Circuits and Systems* 3: 775-778.

Reeves and Salama. (2000) "A Distributed Algorithm for Delay-Constrained Unicast Routing" *IEE/ACM Transactions on Networking* 8(2): 239-250.

Thulasiraman, et al. (1996) "Multithreading Implementation of a Distributed Shortest Path Algorithm on Earth Multiprocessor" *Hight Performance Computing, Proceedings. 3$^{rd}$ International Conference on:* 336-341.

* cited by examiner

DISTRIBUTED QUALITY OF SERVICE ROUTING

BACKGROUND OF THE INVENTION

The present invention relates to distributed systems and methods for finding a path from a source node to a destination node where the path chosen satisfies a path constraint for a first additive path parameter and concurrently optimizes a second additive path parameter.

A goal of many carriers is to have one automatic network control structure. A new set of protocols that make up the framework of Generalized Multi-Protocol Label switching (GMPLS) provides one method to accomplish this goal. Currently, placing data on a telecommunications network involves encapsulating several layers. For example, transporting data traffic on a telecommunications network can involve stacking an Internet Protocol layer on top of an asynchronous transfer mode layer on top of a synchronous optical network layer on top of a dense wavelength division multiplexing layer. Each layer has its own management and control. Interfacing between layers typically involves manual provisioning. Different types of service providers typically manage each layer. GMPLS attempts to reduce the number of interfaces that involve manual provisioning, reduce the operational cost of the network, and improve efficiency.

In other words, GMPLS tries to extend the control plane architecture of MPLS to all non-packet switched networks. Extending the control plane architecture to these transport networks helps to make network administration more intelligent and leads to better use of available resources. One example of a non-packet switched network is a wavelength routed meshed photonic network. GMPLS provides a framework for the control plane architecture by extending MPLS component signaling and routing protocols to dense wavelength division multiplexing (DWDM) based meshed networks.

With respect to the routing protocols, the Internet engineering task force (IETF) has proposed extensions to the open shortest path first (OSPF) and intermediate system-intermediate system (IS-IS) protocols as part of GMPLS to take into consideration the special properties of meshed photonic networks. These routing protocols are intra-domain protocols and hence work within a single domain also called an autonomous system (AS). Since these routing protocols are limited to an AS, any quality of service guarantees provided by the protocols are also limited to providing guarantees within the boundaries of the AS.

Thus a need exists for a set of protocols that facilitate quality of service (QoS) routing between domains owned by different ISP's often operating on different vendor equipment. In other words, there is a need to extend QoS routing beyond one's own domain and into multiple domains on an end-to-end basis.

There are some basic differences between a route computation procedure for an inter-domain protocol and an intra-domain protocol:

1. Most of the protocols like OSPF and IS-IS which are employed with in an AS are link state protocols, hence the path computation is done locally. In contrast, protocols like the border gateway protocol (BGP), which are responsible for inter-domain routing, do path computation in a distributed way.
2. Since an AS falls under a single administrative domain, network administrators experience relatively little concern about policies, security, or exchange of resource and topology information between the routing elements. However, network administrators need to address these issues when conducting inter-domain routing.
3. Changes to a route computing method for an intra-domain protocol are easier to implement than for inter-domain protocol(s) as inter-domain protocols generally run in a distributed manner where there is a greater probability of forming routing loops due to any inconsistencies in the network. Inconsistencies typically occur due to link of node failures.

Relevant to the development of a set of protocols that facilitate quality of service routing between domains is constraint based routing. Constraint based routing implies computing and signaling routes which satisfy a given set of constraints. These constraints can be classified based on the property of the link parameter they represent. Two types of constraints are link constraints, which need to be satisfied on a per link basis, and additive path constraints, where the sum of the corresponding parameter along the path from the source to the destination cannot exceed a pre-determined value.

These constraints have implications for the transport world largely due to the service level agreements (SLA's) between the carriers and the customers. In a packet switched network, network designers measure QoS parameters in terms of parameters such as available bandwidth, jitter, packet loss ratio, and end to end delay. But these measures of quality do not make much sense in the optical world since optical networks are inherently circuit switched.

For wavelength routed transparent networks, which carry data by modulating light, optical parameters, such as optical signal-to-noise ratio (OSNR), polarization mode dispersion (PMD), noise on a link, and cross talk between channels, need more attention. Thus, an inter-domain path computing procedure should take parameters such as these into consideration when calculating a path. Network designers can typically tolerate impairments associated with these parameters within a single AS since the distance between the source and the destination nodes are within some tolerable limit, but such impairments can become significant if the light that is carrying data spans multiple domains without any electronic conversion. Thus, protocols like BGP, if used as part of the control plane for inter-domain routing, should take such parameters into consideration.

Procedures currently exist that relate to computing constrained paths satisfying link constraints and an additive constraint, but these solutions are sequential and are appropriate when the path computation is done locally within a node. Intra-domain protocols, like OSPF, ISIS, do path computation on a local basis. Douglas Reeves and Hussein Salama in "A Distributed Algorithm for Delay-Constrained Unicast Routing, IEEE/ACM Transactions on Networking, Vol. 8, No. 2, April 2000, pp. 239-250, describe a distributed procedure, i.e., a delay constrained unicast routing (DCUR) procedure, to solve the RSP problem. However, the DCUR procedure does not fit into any of the current protocols used in computing paths. Thus, it would be difficult to extend currently used protocols to incorporate the DCUR procedure.

SUMMARY OF THE INVENTION

The present invention relates to distributed systems and methods for finding a path from a source node to a destination node where the path chosen satisfies a path constraint for a first additive path parameter and concurrently optimizes a second additive path parameter. One embodiment of the invention provides a routing method. The method includes receiving at a current node a construct path message from a neighboring previous node. The construct path message includes first and second values for first and second additive parameters. The method includes checking whether the first value satisfies an optimality condition and whether the second value indicates a feasible path given a path constraint. If the first value satisfies an optimality condition and the second value indicates a feasible path given a path constraint, then the method (i) sends out a construct path message to a next neighboring node, (ii) increments a number-of-acknowledgement-messages variable by the number of construct path messages sent, and (iii) adds an entry to a predecessor array stored at the current node. The entry includes an identifier for the predecessor neighboring node, the first path value, and the second path value. If not, the method sends an acknowledgement message to the neighboring previous node.

Another embodiment provides a routing system. The routing system includes a construct path message receiving module operative to receive a construct path message from a neighboring node. The construct path message includes first and second values for first and second additive parameters. The system includes an optimality and path constraint feasibility testing module in communication with the construct path message receiving module and operative to check whether the first value satisfies an optimality condition and whether the second value indicates a feasible path given a path constraint and, if the first value satisfies an optimality condition and the second value indicates a feasible path given a path constraint, operative to send out a construct path message to a next neighboring node. The system includes a number of acknowledgment messages management module in communication with the testing module and operative to increment a number-of-acknowledgement-messages variable by the number of construct path messages sent. The system also includes a predecessor array management module in communication with the testing module and operative to add an entry to a predecessor array stored at the current node. The entry includes an identifier for the predecessor neighboring node, the first path value, and the second path value.

DETAILED DESCRIPTION OF THE ILLUSTRATED EMBODIMENTS

The present invention relates to distributed systems and methods for finding a path from a source node to a destination node where the path chosen satisfies a path constraint for a first additive path parameter, e.g., delay, and concurrently optimizes a second additive path parameter, e.g., cost. This problem in graph theory is called the Restricted Shortest Path (RSP) problem. The RSP problem can be formally stated as follows:

Consider a point-to-point communication network represented as a directed graph $N=(V,E)$, where V is the set of nodes and E is the set of links in N. A link directed form node u to node v is denoted by $e=(u,v)$. Each link e is associated with three non-negative real numbers, cost $c(e)$, delay $d(e)$, and bandwidth $b(e)$.

Define a path P from node $v_o$ to node $v_k$ as an alternating sequence of distinct nodes and links such that $P(v_o, v_k)=v_o, e_1, v_1, e_2, \ldots, e_k, v_k$ where $e_i=(v_{i-1}, v_i) \in E$, for $1 \leq i \leq k$. The cost $c(P)$ and the delay $d(P)$ of the path P are defined as:

$$c(P) = \Sigma\, c(e)$$

$$d(P) = \Sigma\, c(e), \text{ where } e \in P$$

Suppose one is given real numbers T and B, where T serves as a measure of the maximum allowable delay on any s-t path in N and B serves as a measure of the minimum available bandwidth on every link comprising the path, then the problem is to find a feasible s-t path P, i.e., a path that satisfies $d(P) \leq T$ and $b(e) \geq B$ for each e on path s-t, while attempting to minimize the cost function.

Cost, $c(e)$ could be any cost function and in the simplest case this could be initialized to one, representing a hop along the path. More generally, $c(e)$ could represent any additive parameter. Although $d(e)$ represents delay in the example provided above in order to make the present explanation more meaningful, this parameter could be replaced by any other additive parameter distinct from $c(e)$.

Figure 7:
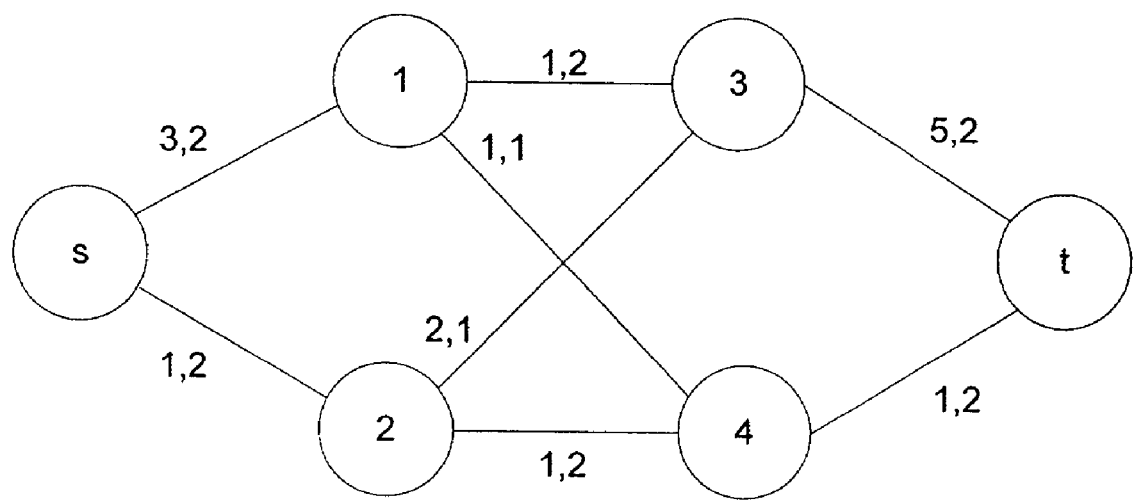
FIG. 7 shows an example of a simple network to illustrate operation of the system of FIG. 1.
Figure 8:
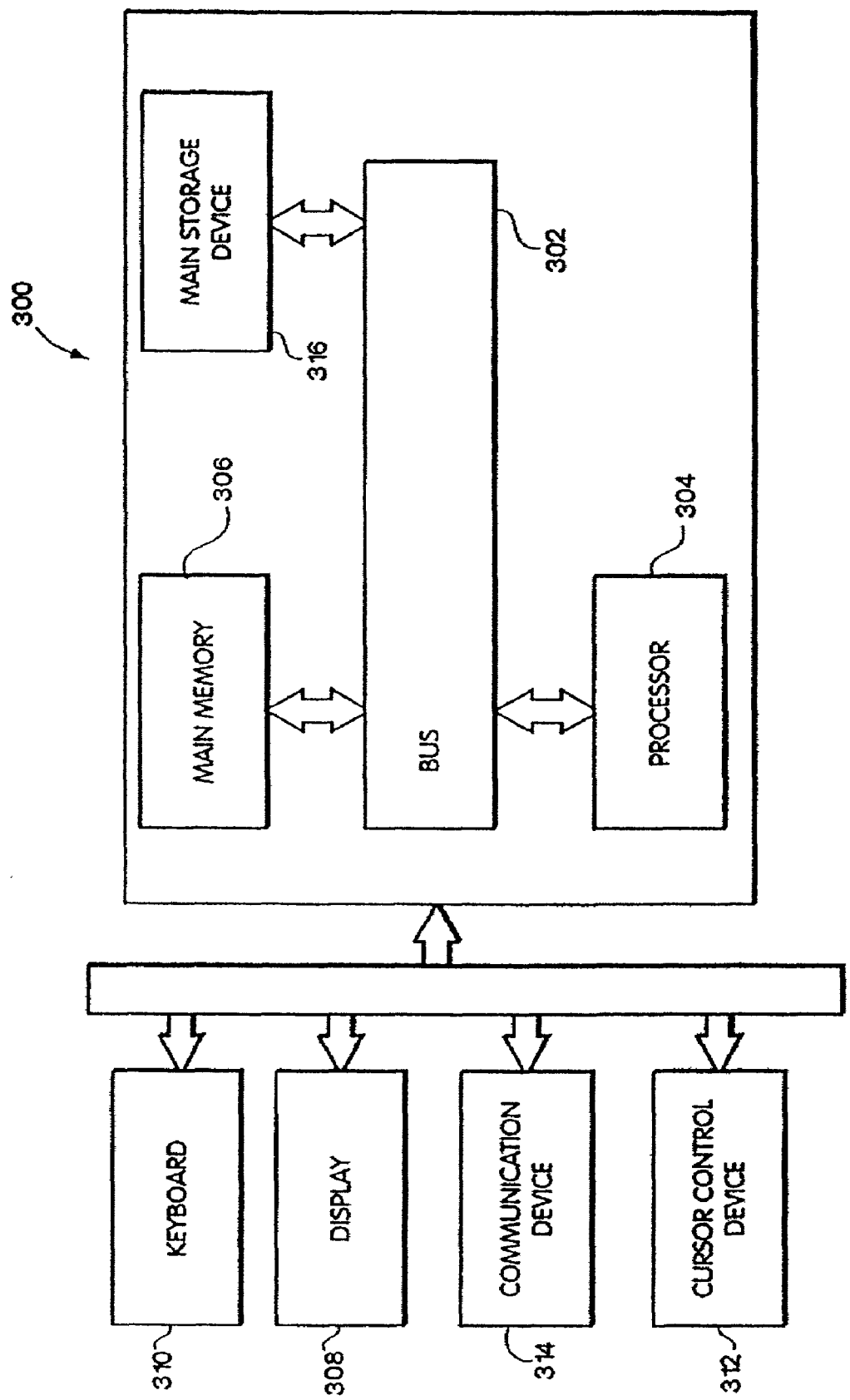
FIG. 8 is a block diagram of components of a node that can implement embodiments of FIG. 1.

Alternatively, this problem could be stated without the link, i.e., bandwidth, constraint. FIG. 7 provides an example of the problem without a link constraint. FIG. 7 shows a network N comprised of nodes s, 1, 2, 3, 4, and t. The following links exist (s,1), (s,2), (1,4) (1,3), (2,3), (2,4), (3,t), and (4,t) and have cost, delay values of (3,2), (1,2), (1,2), (1,1), (2,1), (1,2), (5,2), and (1,2) respectively. Assume a delay constraint of T=5. The shortest s-t path is the path $P_0=\{s, 2, 4, t\}$. But this path does not satisfy the delay constraint of T=5. The s-t paths $P_1=\{s, 1, 4, t\}$ and $P_2=\{s, 2, 3, t\}$ are feasible with cost 5 and 8, respectively. Thus, $P_1$ is the feasible min-cost path. Embodiments of the present invention obtain such feasible min-cost paths.

Stated with or without link constraint(s), the RSP problem is nondeterministic polynomial time (NP)-hard, i.e. there do not appear to be any polynomial time methods to solve the RSP problem. Hence the RSP problem needs to be solved using heuristics.

A solution to the above-described RSP problem provides paths satisfying a path constraint while at the same time optimizing another additive parameter. As noted, one embodiment of a routing procedure according to the invention takes into account a third parameter, a link parameter such as bandwidth, which has to satisfy a link constraint. However, it is possible to extend a procedure according to the present invention to incorporate a plurality of link constraints. In one embodiment, the invention extends BGP to incorporate the procedures described below.

The present invention is an extension of the Bellman-Ford-Moore (BFM) procedure for the shortest path problem. Most of the distributed route computing protocols like routing information protocol (RIP) and BGP use the distributed version of the BFM procedure to route traffic.

Figure 1:
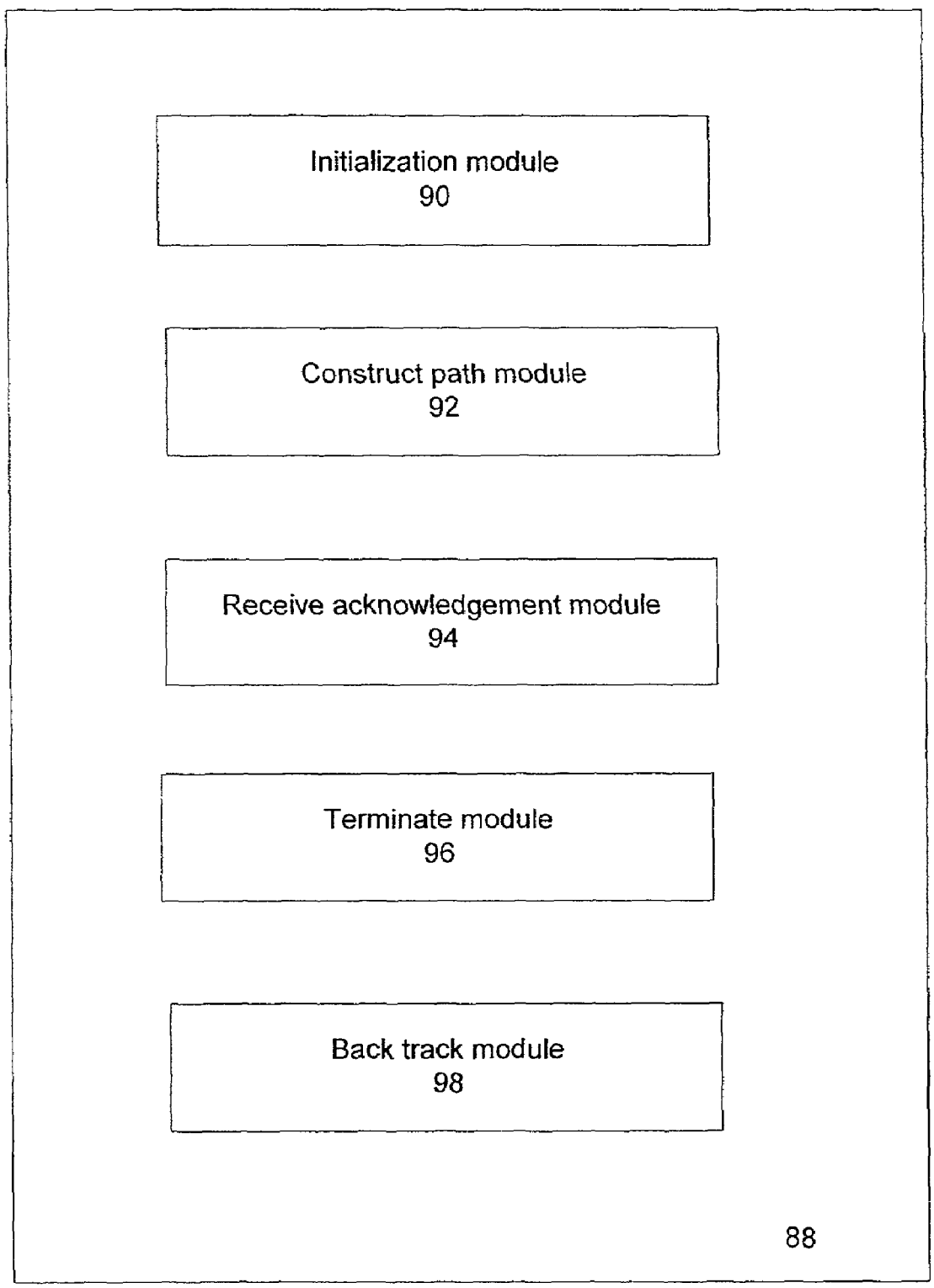
FIG. 1 is a block diagram of a routing system according to one embodiment of the invention.

With reference to FIG. 1, one embodiment of a routing system 88 of the present invention includes an initialization module 90 for performing initialization functions, a construct path module 92 for processing construct path messages, a receive acknowledgment module 94 for processing acknowledgement messages, a terminate module 96 for processing terminate messages, and a back track module 98 for processing back track messages.

Figure 1B:
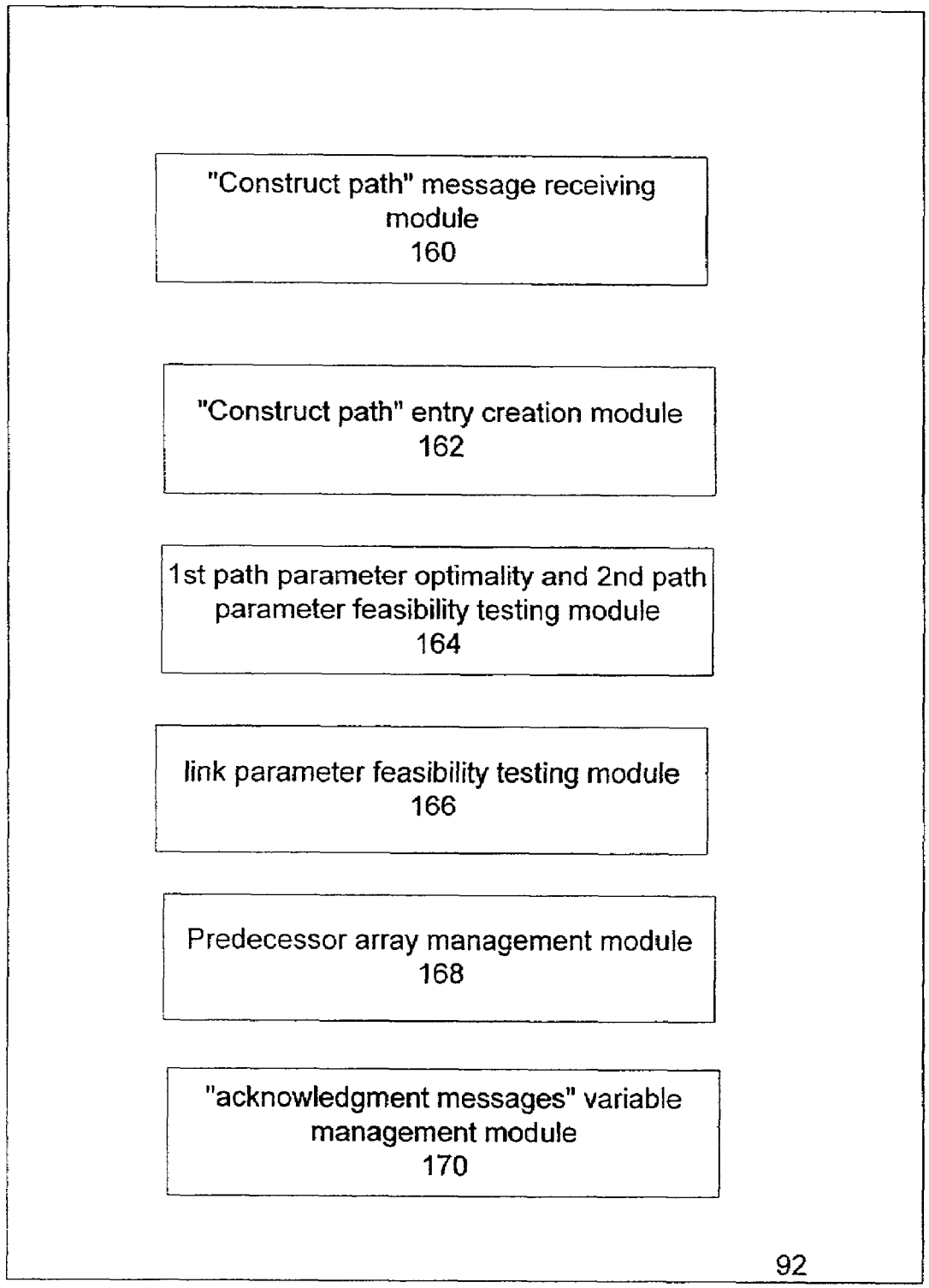
FIG. 1B is a block diagram of one embodiment of the construct path module of FIG. 1.

With reference to FIG. 1B, the construct path (CP) module 92 includes a construct path message receiving (CPMR) module 160 operative to receive a construct_path message from a neighboring node. The construct_path message includes first and second values for first and second additive parameters. The CP module 92 also includes an optimality and path constraint feasibility testing (OPCFT) module 164 in communication with the CPMR module 160 and operative to check whether the first value satisfies an optimality condition and whether the second value indicates a feasible path given a path constraint. If the first value satisfies an optimality condition and the second value indicates a feasible path given a path constraint, the OPCFT module 164 sends out a construct_path message to a next neighboring node. The CP module 92 further includes an acknowledgment messages management module 170 in communication with the testing module 164 and operative to increment a number_of_acknowledgement_messages variable by the number of construct_path messages sent. The CP module 92 also includes a predecessor array management module 168 in communication with the testing module 164 and operative to add an entry to a predecessor array stored at a current node. The entry includes an identifier for the predecessor neighboring node, the first path value, and the second path value.

The CP module 92 can further include a construct path entry creation module 162 operative to create an entry associated with receipt of a construct path message and a link parameter feasibility testing module 166 operative to determine if value for a link parameter meets a link constraint.

In operation, the system of FIG. 1 operates as follows. The following are the variables used to define the state of a node during the execution of methods according to the invention (the subscript i for the variables is to differentiate one route-computing instance from another).

$CLABEL_i$: This variable can represent number or hops or any other cost function. It contains the sum of the edge cost values on the path from the source to a given node.

$DLABEL_i$: This variable represents the sum of the edge delay values on the path from the source to a given node.

$PREDARRAY_i$: This is vector element that is part of an array that is contained in a node. Every time a node receives a "Construct_Path" message and its $CLABEL_i$, and $DLABEL_i$ is modified, the id of the labeling node, its cost and delay values are stored in the array, hence every entry is of the form (a, b, c) where a is the pred node id, b is the $CLABEL_i$, value and c is the $DLABEL_i$ value.

$NUM\_ACK_i$: This variable stores the number of Acknowledgments (Ack) messages that are yet to be received by a node. A node expects an Ack for every "Construct_Path" message sent out by a node.

SHODELAYDIST: This is a vector that holds the shortest distance values with respect to delay to every other node. This vector could be constructed by exchanging distance vectors among neighbors similar to the technique used by distant vector protocols.

Figure 2:
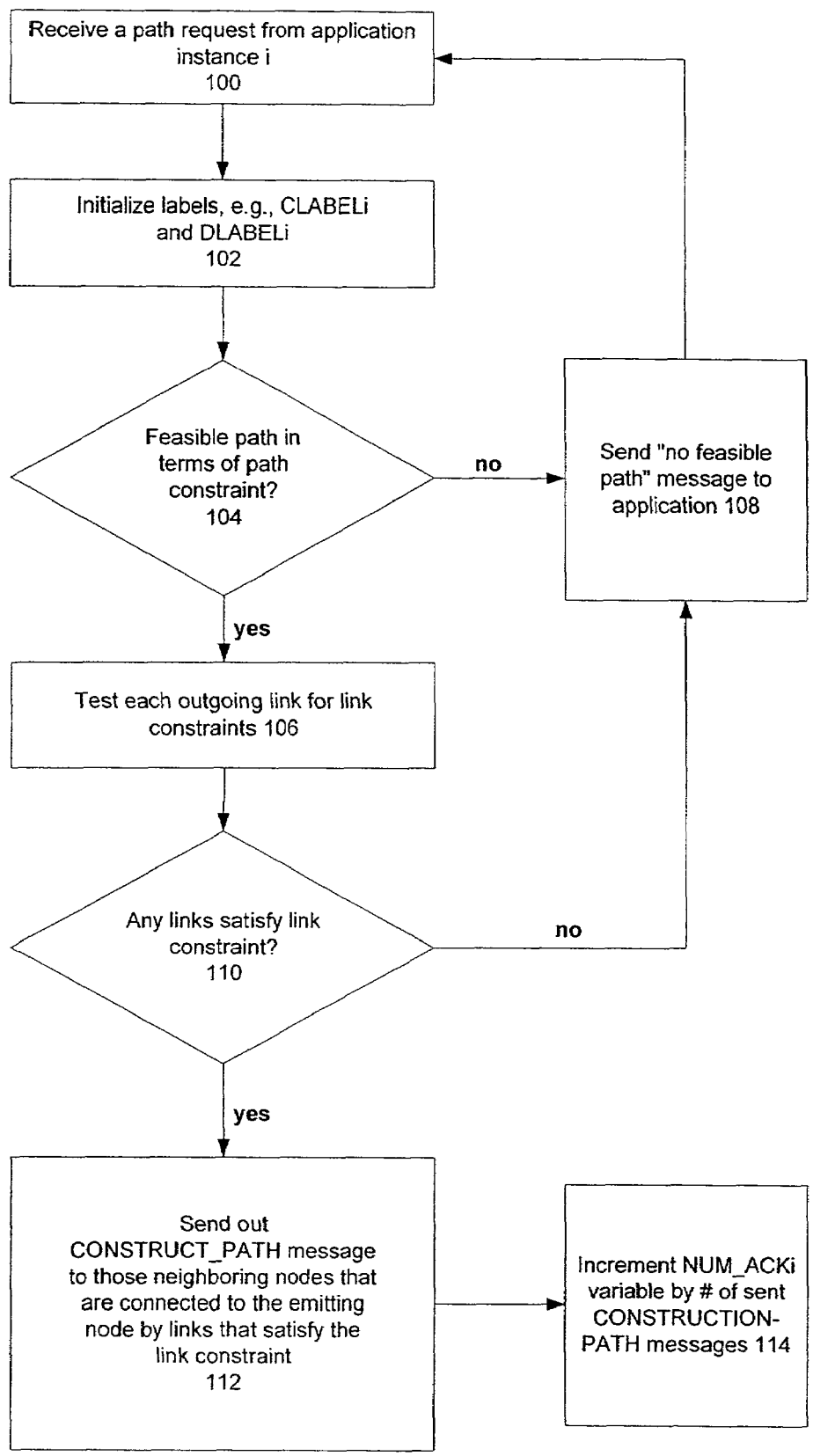
FIG. 2 is a flow chart illustrating one embodiment of a method for constructing a path using the system of FIG. 1.

One can divide embodiments of methods according to the invention into the following phases/procedures:

Initialization Phase:

FIG. 2 illustrates one embodiment of an initialization phase. Label the instance of the application requesting a path as i. The source node ($src_i$) receives 100 from an application a request for a path from the $src_i$ node to a destination node ($dest_i$). Also associated with the request is a path constraint $T_i$, and link constraint $B_i$. The method initializes 102 the $CLABEL_i$ and $DLABEL_i$ values to zero.

The method checks 104 whether there exists a feasible path in terms of a path constraint. This test can be executed by comparing the SHODELAYDIST vector for the destination entry with the constraint $T_i$. If the value of $T_i$ is less than the corresponding value in the vector, then there is no feasible path and the method returns 108 an appropriate message to the calling application. Else, if there is a feasible path, the method tests 106 each of the outgoing links for the link constraint $B_i$. The method sends out 112 a construct_path, message to its neighbors, only if the link connecting the current node and the neighboring node has sufficient bandwidth. The method performed at the current node also increments 114 the $NUM\_ACK_i$ variable by the number of Construct_path messages sent out.

The Construct_path, message consists of the following parameters, the application id i, the dest id $dest_i$, the $CLABEL_i$, $DLABEL_i$, the constraints $T_i$, and $B_i$, the message also carries a $PREV\_NODE_i$ which is the id of the node sending the message.

Figure 3:
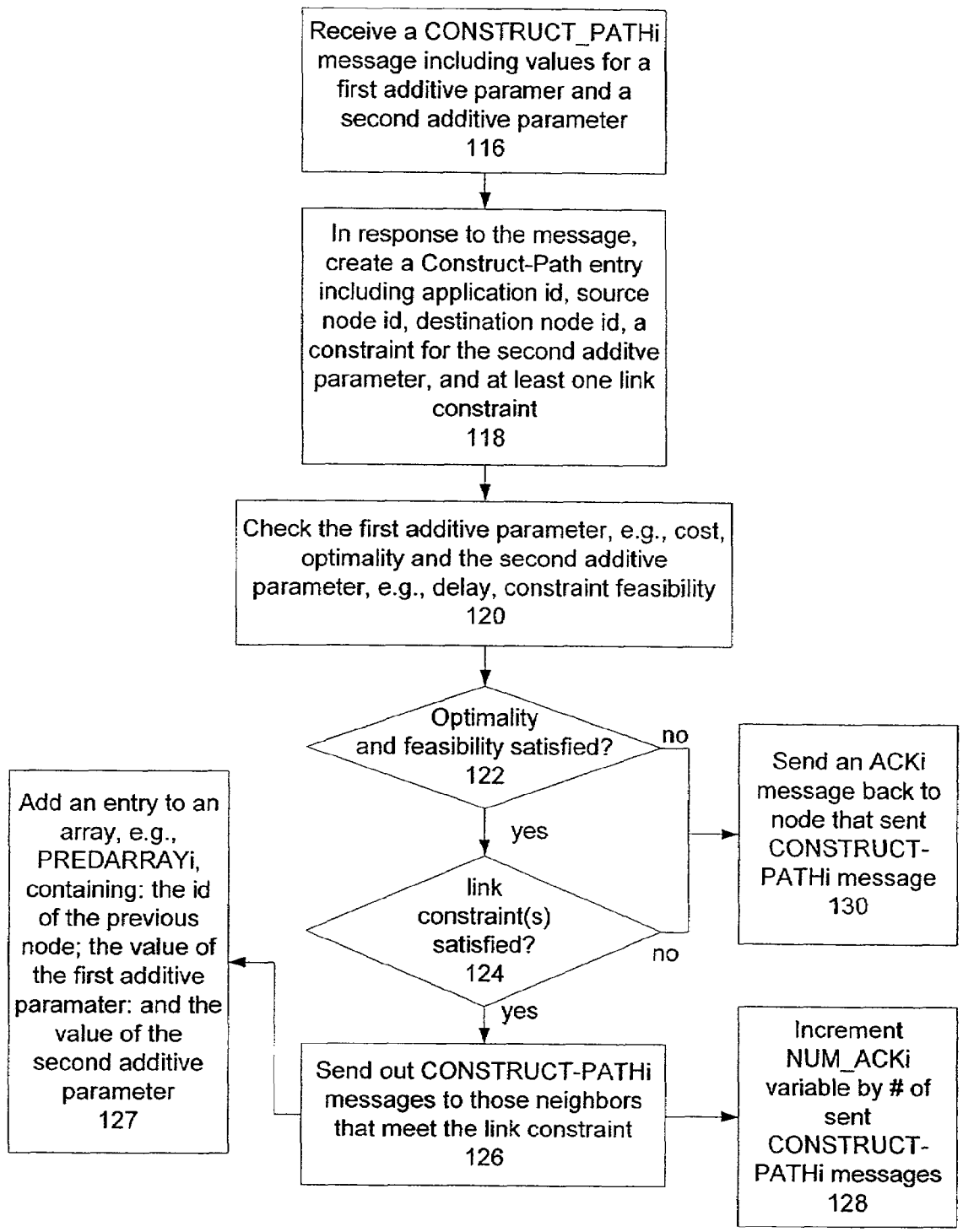
FIG. 3 is a flow chart illustrating one embodiment of a method for initiating a path using the system of FIG. 1.

Path Construction Phase:

With reference to FIG. 3, according to one embodiment of a method according to the invention, when a node n receives 116 a Construct_path, message from one of its neighbor's m, the method creates 118 an entry with respect to the application id i, the source node $src_i$ where the path request originated, the destination node dest, and the constraints T, and B. The combination of these parameters uniquely identifies a message.

Using the $CLABEL_i$, and $DLABEL_i$, values included in the Construct_path message, the method checks 120 the first additive parameter, e.g., cost, optimality and the second additive parameter, e.g., delay, feasibility conditions. If the first value satisfies an optimality condition and the second value indicates a feasible path given a path constraint 122, then the method tests whether each outgoing link satisfies 124 a link constraint. If an outgoing link to a next neighboring node satisfies the link constraint, then the method (i) sends 126 out a construct_path message to the next neighboring node, (ii) increments 128 a number_of_acknowledgement_messages variable by the number of construct_path messages sent, and (iii) adds 127 an entry to a predecessor array stored at the current node, the entry including an identifier for the predecessor neighboring node, the first path value, and the second path value. If either of the tests at 122 or 124 fail, the method sends 130 an acknowledgement message to the neighboring previous node.

Figure 4:
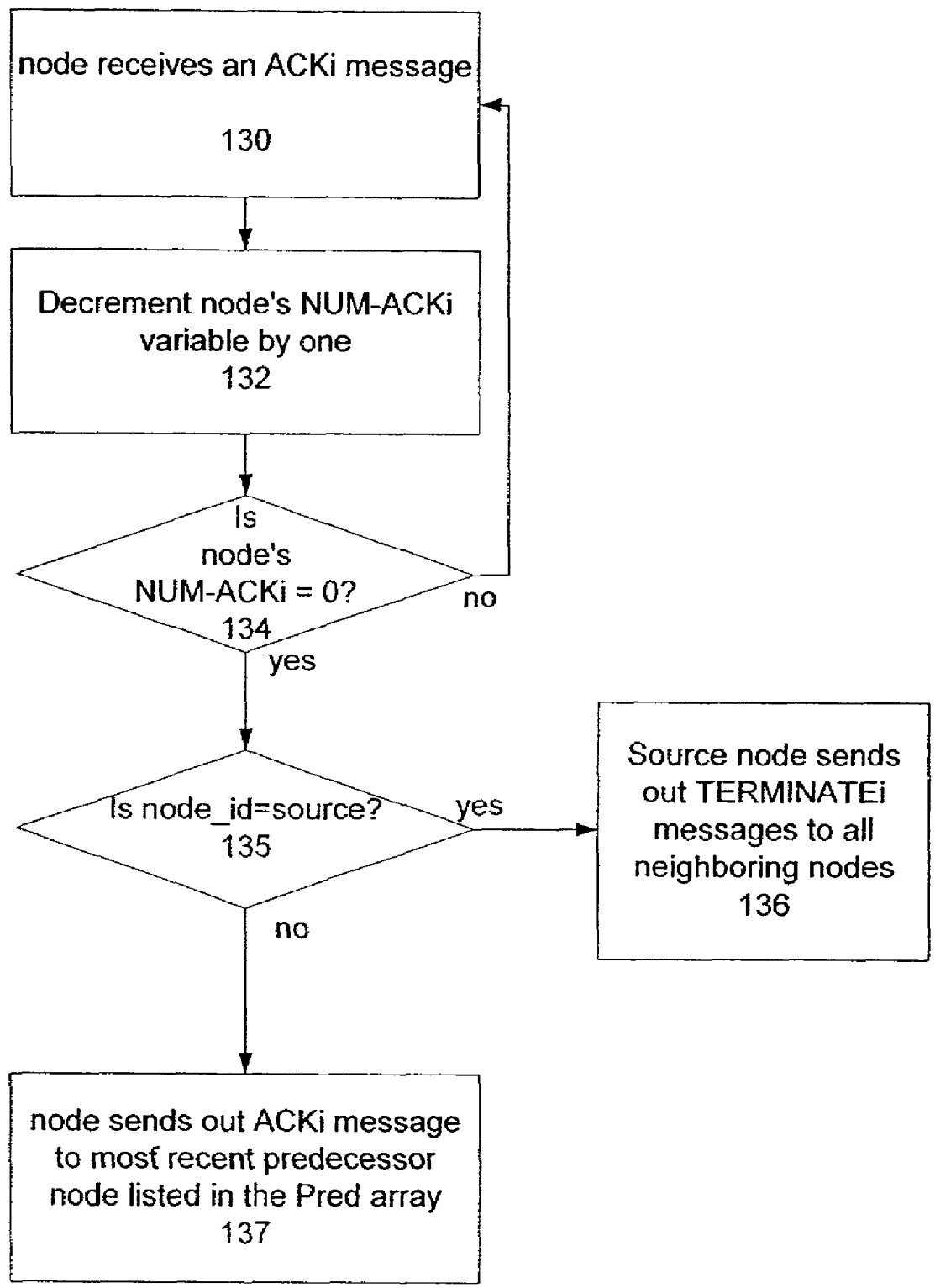
FIG. 4 is a flow chart illustrating one embodiment of a method for receiving acknowledgment messages using the system of FIG. 1.

Receive Acknowledgment Phase:

With reference to FIG. 4, whenever a node receives 130 an $Ack_i$ message, the method decrements 132 its $NUM\_ACK_i$ variable by one. This acknowledgement-based mechanism determines the termination of the procedure, an important step in a distributed implementation. After decrementing, the method determines 134 whether the $NUM\_ACK_i$ variable is equal to zero. If it is, then the method determines if the node is the source node. If the node is the source node, the method sends 136 out terminate messages to all neighboring nodes. If the node is not the source node, then the method sends 137 out an ACK$_i$ message to the most recent predecessor node listed in the predecessor array.

Figure 5:
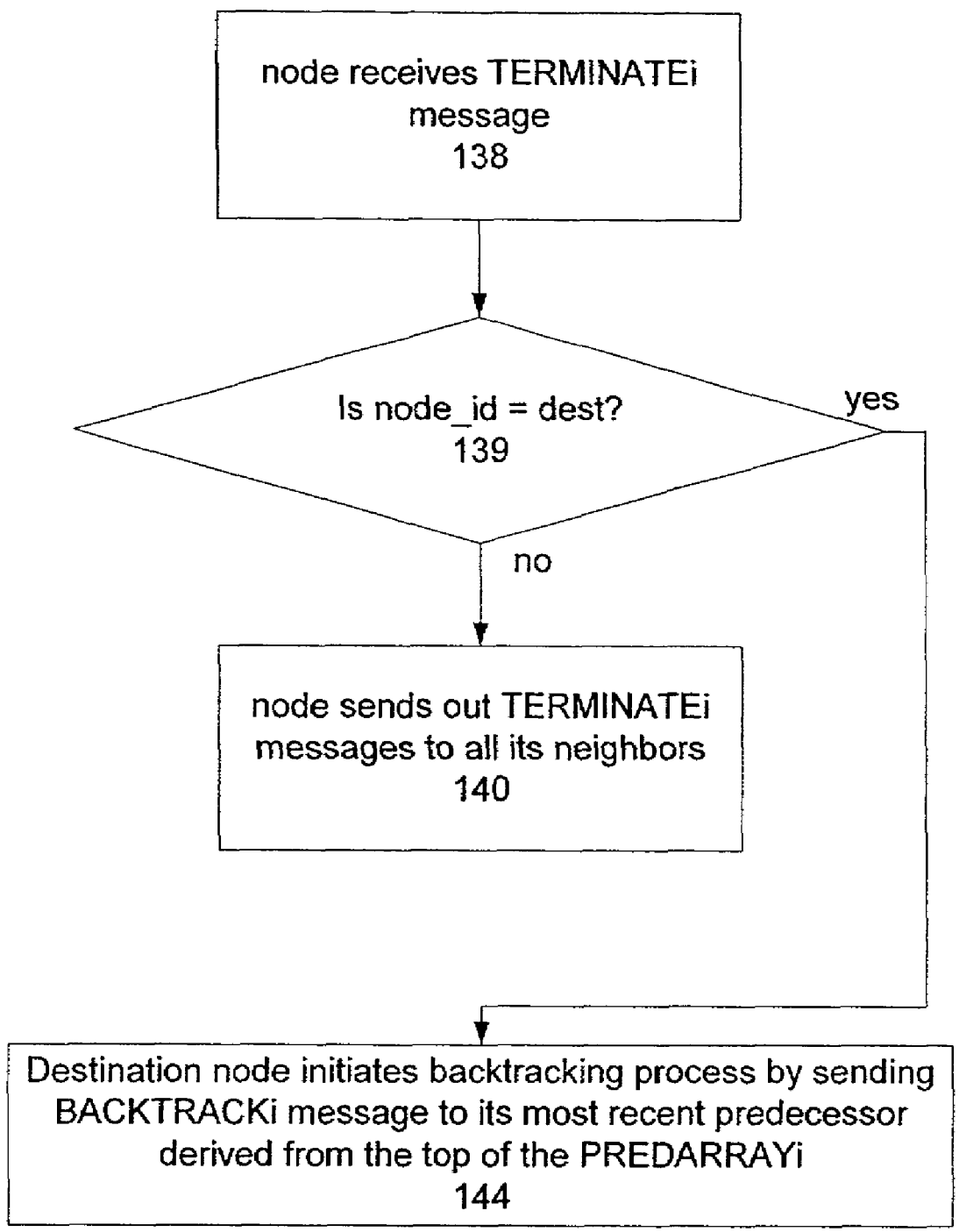
FIG. 5 is a flow chart illustrating one embodiment of a method for determining when to send termination messages using the system of FIG. 1.

Terminate Phase:

With reference to FIG. 5, when a node receives 138 a terminate message, the method determines 139 whether the receiving node is the destination node. If it is, then the method sends 144 a back track message to its most recent predecessor derived from the top of the predecessor array. If it is not, then the method sends out 140 terminate messages to all its neighbors.

Figure 6:
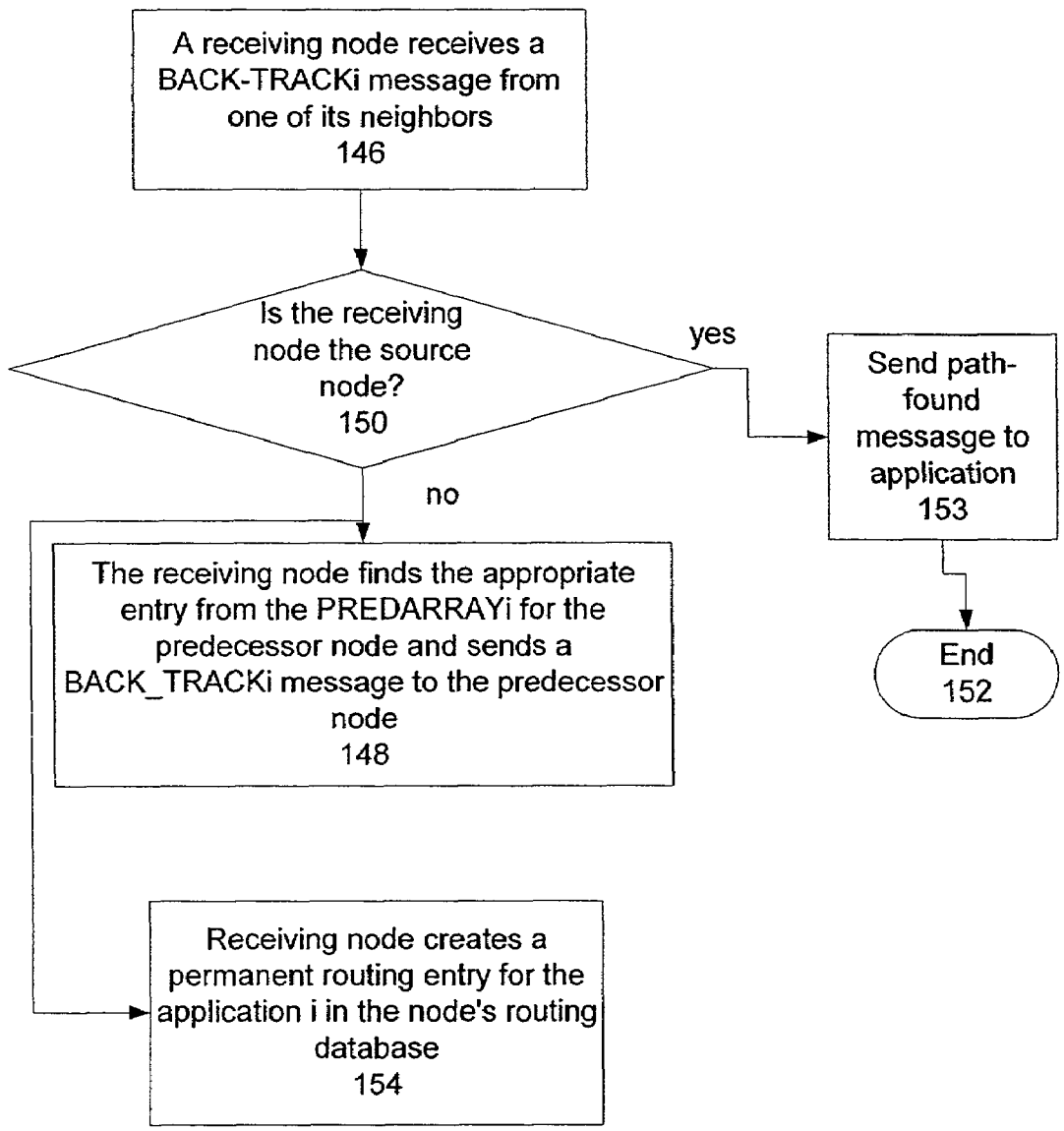
FIG. 6 is a flow chart illustrating one embodiment of a method for propagating back track messages using the system of FIG. 1.

Backtracking Phase:

With reference to FIG. 6, when a node x receives 146 a Back_Track$_i$ message from one of its neighbors, e.g., node y, the method determines 150 if node x is the source node. If it is, the method sends 153 a path found message to the application that originally requested the path. If it is not, the method finds 148 the appropriate entry from the PREDARRAY$_i$, and if that node of the entry is z, it sends the Back_Track$_i$ message to z, and the method creates 154 a permanent routing entry for the application i in the current node, i.e., node x's, routing database.

An expansion on the process of determining the predecessor node based on a back track message now follows. In the present scheme PREDARRAYi(v) is a list of entries. Each entry in the list has three components (x, y, z). Initially PREDARRAYi (v) for every node v has only one entry, namely (v,0,0). When the labels of a node v are updated by node u then an entry (x,y,z) is added to the list PREDARRAYi (v) where x ,y and z are defined as follows.

x=u, y=CLABEL(u), and z=DLABEL(u).

With this definition of PREDARRAYi(v) lists, our scheme for tracing the s-t path is:
1. Let the final entry in PREDARRAYi(t) be (x,y,z). Note that t received its labels from node x, and y=CLABEL(x) and z=DLABEL(x) are the values of these variables when x labeled t. Also note that x is the predecessor of t in the final s-t path.
2. Search in the PREDARRAYi(x) list for an entry (x', y', z') such that y=y'+c$_{x,x}$ and z=z'+d$_{x',x}$, Then x' is the predecessor of x in the final s-t path. Next set x=x', y=y',z=z'
3. Repeat step 2 until x=s.

The messages described above, e.g., the construct_Path message and the acknowledgment message, refer to messages having the functionality outlined above. Thus, the present invention is not limited in scope to messages having identical names to those used herein for illustrative purposes. In other words, embodiments of the present invention contemplate the use of messages that perform the functions described above and are not limited by the name of the message types.

Having described phases of embodiments of the invention, psuedo code of the above-referenced phases/procedures now follows:

PROCEDURE VARIABLES

The following variables are assumed to have the same meaning in all the procedures and are also used in receiving a particular message:

| | |
|---|---|
| app_id: | this is the id of the application. |
| dest: | NODE_ID of the destination. |
| source: | NODE_ID of the source. |

-continued

| | |
|---|---|
| curr_node: | This holds the NODE_ID of the node in consideration. |
| clabel, dlabel: | These hold the CLABEL and the DLABEL. |
| clabel_prev, dlabel_prev: | These are used to hold the CLABEL and DLABEL values from the PRED array |
| succ_node: | NODE_ID of the next node of the current node in the final source-to-destination path. |
| prev_node: | NODE_ID of the node preceding the current node trying to update the current node. |

Source Initialization Procedure

```
Source_initialization( app_id, dest, T)
{
    /*Procedure invoked by an application in the source node, initialize
    the parameters in the source node*/
    APP_ID = app_id
    CLABEL = 0
    DLABEL = 0
    SOURCE = NODE_ID
    DEST = dest
    curr_node = NODE_ID
    /*if the delay of the smallest delay path is greater than the delay
    bound then no feasible path can be found*/
    If D[dest] > T
        Send and "Infeasible Path" message to the application.
    End If
        /*Send Construct_path message to all the outgoing links of the
        node*/
    Else
        For all nodes x in ON
        Send Construct_path(app_id, SOURCE, DEST, curr_node,
        CLABEL, DLABEL, T) to x
    End Else
        NUM_ACK = NUM_ACK + number of nodes in ON
}
```

Construct Path Procedure

```
Construct_path(app_id, source, dest, prev_node, clabel, dlabel, T)
{
    /*Procedure invoked when a node receives a Construct_Path
    message, if the node receives a Construct_path message for the first
    time, initialize APP_ID, SOURCE and the DEST parameters*/
    APP_ID = app_id
    SOURCE = source
    DEST = dest
    curr_node =NODE_ID
    /*Check for the Cost Optimality and the Delay Constraint
    Conditions*/
    If clabel + c_prev_node,curr_node < CLABEL and
        dlabel + d_prev_node,curr_node + D[dest] ≦ T
    If NUM_ACK ≠ 0
        /*Send an Ack message back to the most recent node which
        labeled the current node with a smaller cost. This is the first
        element in the most recent entry in the PRED array. Let this
        node be x */
    Send an Ack (app_id, source, dest) message to x
    End If
    CLABEL = clabel + c_prev_node,curr_node
    DLABEL = dlabel + d_prev_node,curr_node
    Add to the PRED array an entry {prev_node, clabel, dlabel}
    /*Send Construct_path messages on all its outgoing links*/
    For all nodes x in ON
    Send Construct_path(app_id, source, dest, curr_node, CLABEL,
    DLABEL,T) to x
    NUM_ACK = NUM_ACK + number of nodes in ON
    End If
    Else
        /*Send an Ack message to the prev_node if update is not
```

-continued

```
        possible*/
        Send an Ack(app_id, source, dest) message to prev_node
}
```

Receive Acknowledgement Procedure

```
Receive_ack(app_id, source, dest)
{
    /*Procedure invoked when a node receives an Ack message. If an
    Ack message is received then decrement the number of pending
    acknowledgements by one*/
    NUM_ACK = NUM_ACK -1
    /*If source gets all its Ack messages, send Terminate messages to its
    out-neighbors*/
    If NUM_ACK = 0 and NODE_ID = source
        Send Terminate(app_id, source, dest) message to all the nodes
        in ON.
    End If
    /*Else send back an Ack message to the most recent predecessor node
    in the PRED array*/
    Else if NUM_ACK=0
        Send an Ack(app_id, source, dest) message to the most recent
        node which updated it.
    End Else
}
```

Terminate Procedure

```
Terminate( app_id, source, dest)
{
    /* Procedure invoked when a node receives a Terminate message*/
    If NODE_ID = dest
        /* Let u, clabel_prev, dlabel_prev be the content of the last
        entry of the PRED array in the destination node*/
        Send a Back_Track(app_id, source, dest, NODE_ID,
        clabel_prev, dlabel_prev) message to u
    End If
    Else
        For all the nodes x in ON
            Send Terminate(app_id, source, dest) message to x.
    End Else
}
```

Back Track Procedure

```
Back_Track ( app_id, source, dest, succ_node, clabel, dlabel)
{
    /*Procedure invoked when a node receives a Back_Track message*/
    curr_node =NODE_ID
    /*If Back_Track message has reached the source, then stop*/
    If curr_node= source
        SUCC_NODE= succ_node
        Send Path_found message to the application
    End If
    Else
        For all entries in the PRED array
        /*Let u, clabel_prev and dlabel_prev be the values from the
        PRED array taken one at a time*/
        If clabel_prev + c_{u,curr_node} = clabel and
            dlabel_prev +d_{u,curr_node} = dlabel
            /* If the predecessor has been found*/
            PRED_NODE = u
            SUCC_NODE = succ_node
            /* send Back_Track message to the preceding node u */
            Send Back_Track (app_id, source, dest, curr_node
            clabel_prev, dlabel_prev) to u
```

```
        End If
    End Else
}
```

Having provided psuedo code for embodiments of the invention, a description of a system 300 representing an exemplary node that can implement features of the present invention now follows. The system 300 includes a bus or other communication means 302 for communicating information between components of the system. The system 300 further includes a processor 304 coupled to the bus 302 and a main memory, e.g., a random access memory (RAM) or other dynamic storage device 306 also coupled to the bus. The RAM stores instructions for execution by the processor 304. The main memory can also store temporary variables. The system 300 can include a mass storage device 316 coupled to the bus 302 for storing information that is not accessed as regularly as information stored in RAM.

System 300 can include a display 308 for displaying information such as status of the node. The system can include an input devices such as a cursor control device 312 and a keyboard 310 for allowing a network administrator to provide input.

System 300 can also include a communication device 314. The communication device 314 allows the system to communicate with other nodes. The communication device 314 can include a network card, an RF transceiver, and other well-known communication devices for coupling to a network.

Embodiments of a mechanism according to the present invention for finding a path satisfying a constraint can be used in protocols such as BGP, where paths are computed in a distributed manner. With respect to a wavelength routed network where BGP would be a part of the GMPLS control plane, one could extend BGP suitably to find constrained paths spanning multiple domains.

The present procedure is an extension to the BFM procedure, which is used in many routing protocols, where paths are computed based on distance vectors. Thus, it is relatively easy to extend many currently used routing protocols to incorporate the present invention and to compute constrained paths. The present solution proposed for the RSP problem would make a network scalable by breaking down large photonic network into different AS's without compromising on the QoS promised to the network's costumers. The present invention also facilitates bridging the gap between the inter-domain and the intra-domain protocols in computing paths satisfying link and path constraints.

What is claimed is:

1. A routing method comprising:
   receiving at a current node a construct path message from a neighboring previous node, the construct path message including first and second values for first and second additive parameters;
   checking whether the first value satisfies an optimality condition and whether the second value indicates a feasible path given a path constraint; and
   if the first value satisfies an optimality condition and the second value indicates a feasible path given a path constraint, then testing whether each outgoing link satisfies a link constraint;
   if an outgoing link to a next neighboring node satisfies the link constraint, then (i) sending out a construct path message to the next neighboring node, (ii) incrementing a number-of-acknowledgement-messages variable by the number of construct path messages sent, and (iii) adding an entry to a predecessor array stored at the current node, the entry including an identifier for the predecessor neighboring node, the first path value, and the second path value.

2. The routing method of claim 1, wherein the method further comprises:
storing a current node value corresponding to the first additive parameter; and wherein checking whether the first value satisfies an optimality condition comprises:
determining whether the first value of the first additive parameter plus a measure of a link value for the first additive parameter is less than the stored current node value corresponding to the first parameter; and
if the first value of the first additive parameter plus a measure of a link value for the first additive parameter is less than the stored current node value corresponding to the first parameter, setting the stored current node value equal to the first value of the first additive parameter plus a measure of a link value for the first additive parameter.

3. The routing method of claim 1, further comprising:
prior to receiving at a current node a construct path message, receiving at a source node a path request from an application for a path from the source node to a destination node;
checking whether a feasible path exists given a path constraint;
if a feasible path exists, then testing whether each outgoing link satisfies a link constraint;
if an outgoing link to a next neighboring node satisfies the link constraint, then sending out a construct path message to the next neighboring node;
else sending a no feasible path message to the application;
else sending a no feasible path message to the application; and
incrementing the variable for the number of acknowledge messages that need to be received by the number of construct path messages sent.

4. The routing method of claim 3, wherein the method further comprises:
prior to receiving at a current node a construct path message, initializing first and second stored values associated with first and second additive parameters and stored at each node.

5. The routing method of claim 3, wherein the method further comprises:
receiving at a node an acknowledgement message;
decrementing the number-of-acknowledgement-messages variable by one;
determining whether the node's number-of-acknowledgement-messages variable is equal to zero; and
if the node's number-of-acknowledgement-messages variable is equal to zero, then determining if the node is the source node;
if the node is the source node, then sending out terminate messages to neighboring nodes;
else sending out an acknowledgement message to the most recent predecessor node as listed in the predecessor array.

6. The routing method of claim 5, wherein the method further comprises:
receiving at a node a terminate message; and determining if the node is the destination node;
if the node is the destination node, then sending a back track message to the predecessor node as listed in the predecessor array;
else sending out terminate messages to neighboring nodes.

7. The routing method of claim 6, wherein the method further comprises:
receiving a backtrack message at a node;
determining if the receiving node is the source node;
if the receiving node is the source node, then sending path_found message to the application;
else (i) determining a predecessor node from the predecessor array, (ii) sending a back track message to the predecessor node, and (iii) creating a permanent entry for the application in a routing database for the node.

8. The routing method of claim 7, wherein determining a predecessor node from the predecessor array comprises:
receiving first predecessor identification data from a neighboring node;
searching the predecessor array for a first entry corresponding to the first predecessor identification data; and
forwarding second predecessor identification data to the predecessor node associated with the first entry.

9. The routing method of claim 8, wherein the predecessor identification data includes an identifier for a predecessor neighboring node, a first path value, and a second path value.

10. The routing method of claim 1, wherein the method further comprises:
creating a construct path message entry, the entry including data related to a requesting application, a source node, a destination node, a path constraint and a link constraint.

11. The routing method of claim 1, wherein the construct path message includes data related to a requesting application, a destination, the path constraint, the link constraint, and a previous node.

12. A routing system comprising:
a construct path message receiving module operative to receive a construct path message from a neighboring node, the construct path message including first and second values for first and second additive parameters;
an optimality and path constraint feasibility testing module in communication with the construct path message receiving module and operative to check whether the first value satisfies an optimality condition and whether the second value indicates a feasible path given a path constraint; and, if the first value satisfies an optimality condition and the second value indicates a feasible path given a path constraint, operative to send out a construct path message to a next neighboring node;
a number of acknowledgment messages management module in communication with the testing module and, after the operation of the testing module, the number of acknowledgement message management module is then operative to increment a number-of-acknowledgement-messages variable by the number of construct path messages sent; and
a predecessor array management module in communication with the testing module and, after the operation of the testing module, the predecessor array management module is then operative to add an entry to a predecessor array stored at the current node, the entry including an identifier for the predecessor neighboring node, the first path value, and the second path value.

13. A routing method comprising:
receiving at a current node a construct path message from a neighboring previous node, the construct path message including first and second values for first and second additive parameters;
checking whether the first value satisfies an optimality condition and whether the second value indicates a feasible path given a path constraint; and if the first value satisfies an optimality condition and the second value indicates a feasible path given a path constraint, then (i) sending out a construct path message to a next neighboring node, (ii) incrementing a number-of-acknowledgement-messages variable by the number of construct path messages sent, and (iii) adding an entry to a predecessor array stored at the current node, the entry including an identifier for the predecessor neighboring node, the first path value, and the second path value.

14. The routing method of claim 13, wherein checking whether the first value satisfies an optimality condition and whether the second value indicates a feasible path given a path constraint comprises: if the first value satisfies an optimality condition and the second value indicates a feasible path given a path constraint, then testing whether each outgoing link satisfies a link constraint; if an outgoing link to a next neighboring node satisfies the link constraint, then (i) sending out a construct path message to a next neighboring node, (ii) incrementing a number-of-acknowledgement-messages variable by the number of construct path messages sent, and (iii) adding an entry to a predecessor array stored at the current node, the entry including an identifier for the predecessor neighboring node, the first path value, and the second path value; else sending an acknowledgement message to the neighboring previous node.

15. The routing method of claim 13, wherein the method further comprises:
   storing a current node value corresponding to the first additive parameter; and wherein checking whether the first value satisfies an optimality condition comprises:
   determining whether the first value of the first additive parameter plus a measure of a link value for the first additive parameter is less than the stored current node value corresponding to the first parameter; and
   if the first value of the first additive parameter plus a measure of a link value for the first additive parameter is less than the stored current node value corresponding to the first parameter, setting the stored current node value equal to the first value of the first additive parameter plus a measure of a link value for the first additive parameter.

16. The routing method of claim 13, further comprising:
   prior to receiving at a current node a construct path message, receiving at a source node a path request from an application for a path from the source node to a destination node;
   checking whether a feasible path exists given a path constraint;
   if a feasible path exists, then testing whether each outgoing link satisfies a link constraint;
   if an outgoing link to a next neighboring node satisfies the link constraint, then sending out a construct path message to the next neighboring node;
   else sending a no feasible path message to the application;

else sending a no feasible path message to the application; and
   incrementing the variable for the number of acknowledge messages that need to be received by the number of construct path messages sent.

17. The routing method of claim 16, wherein the method further comprises:
   prior to receiving at a current node a construct path message, initializing first and second stored values associated with first and second additive parameters and stored at each node.

18. The routing method of claim 16, wherein the method further comprises:
   receiving at a node an acknowledgement message;
   decrementing the number-of-acknowledgement-messages variable by one;
   determining whether the node's number-of-acknowledgement-messages variable is equal to zero; and
   if the node's number-of-acknowledgement-messages variable is equal to zero, then determining if the node is the source node;
   if the node is the source node, then sending out terminate messages to neighboring nodes;
   else sending out an acknowledgement message to the most recent predecessor node as listed in the predecessor array.

19. The routing method of claim 18, wherein the method further comprises:
   receiving at a node a terminate message; and
   determining if the node is the destination node;
   if the node is the destination node, then sending a back track message to the predecessor node as listed in the predecessor array;
   else sending out terminate messages to neighboring nodes.

20. The routing method of claim 19, wherein the method further comprises:
   receiving a back track message at a node;
   determining if the receiving node is the source node;
   if the receiving node is the source node, then sending path_found message to the application;
   else (i) determining a predecessor node from the predecessor array, (ii) sending a back track message to the predecessor node, and (iii) creating a permanent entry for the application in a routing database for the node.

21. The routing method of claim 20, wherein determining a predecessor node from the predecessor array comprises:
   receiving first predecessor identification data from a neighboring node;
   searching the predecessor array for a first entry corresponding to the first predecessor identification data; and
   forwarding second predecessor identification data to the predecessor node associated with the first entry.

* * * * *